Patented June 27, 1950

2,512,689

UNITED STATES PATENT OFFICE 2,512,689

NICOTINE COMPOUNDS CONTAINING UNIVALENT COPPER

Claude R. Smith, Philadelphia, Pa., assignor to the United States of America as represented by the Secretary of Agriculture No Drawing. Application December 28, 1945, Serial No. 637,763

4 Claims. (Cl. 260—270)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to me of any royalty thereon.

This invention relates to the preparation of new and useful compositions of matter containing nicotine in chemical combination with univalent copper and is more particularly concerned with the preparation of compounds of nicotine with cuprous cyanide, cuprous thiocyanate, and cuprous halides other than fluorides.

The new compositions of matter of this invention are useful as insecticides and, when in crystal form, as fluorescent materials or ingredients of fluorescing powders and varnishes.

The cuprous nicotine cyanide of this invention is directly prepared in crystal form free from water and excess cyanogen and, in this respect, is different from any other compounds of this general type. It is readily filtered from the products of the reaction and quickly freed from surface moisture by exposure to air. The crystal compound of the exact composition represented by the formula $(CuCN)_2.C_{10}H_{14}N_2.HCN$ does not fluoresce under ultraviolet light but treatment with dilute acids or sodium bisulphite produces an altered crystal fluorescing yellowish green. Treatment of the amorphous brown cuprous nicotine cyanide with sodium bisulphite solution also produces a fluorescing crystal structure.

The nicotine-universal copper containing compounds of this invention may be divided into two types, namely, double salt compounds of the formula $(Cu^+A)_x.C_{10}H_{14}N_2.HA$ and nicotinammino compounds of the formula $(Cu^+A)_x.C_{10}H_{14}N_2$, wherein $x$ is an integer not exceeding 2 and A represents one of the group of anions $-CN$, $-CNS$, $-Cl$, $-Br$, and $-I$, each A in the formula for the double salt being identical to the other A in that same formula.

In order to prepare a double salt in accordance with this invention, the cuprous salt containing the selected anion is treated with a soluble nicotine salt and a soluble salt of the selected anion, preferably an ammonium salt. Ammonium salts by their solvent action hasten the formation of uniform crystalline products with little or no contamination of the final product.

In order to prepare a nicotinammine, the cuprous salt containing the selected anion is treated with nicotine base in the presence of a small proportion of a soluble sulphite and free ammonia to avoid oxidation and hasten crystallization.

The following examples illustrate more specifically the manner of preparing the new compounds of this invention:

Example 1

One mole of cuprous thiocyanate in aqueous suspension free from excessive amounts of mineral acids is caused to react with one mole of a nicotine salt and an equivalent amount of ammonium thiocyanate. Crystals of the double salt slowly form, increasing in nicotine content until a product closely corresponding to the double salt $CuCNS.C_{10}H_{14}N_2.HCNS$ results.

Example 2

One mol of cuprous thiocyanate in water suspension is treated with one mole of nicotine, preferably assisted by a small proportion of ammonia and sodium sulphite to hasten crystallization and prevent oxidation. The crystals can be filtered, washed with water, and dried in air. The nicotinammine produced is $CuCNS.C_{10}H_{14}N_2$ but usually contains somewhat less than the theoretical amount of nicotine required by the formula.

Example 3

One mole of cuprous bromide in water suspension is treated with one mole of nicotine assisted by a small proportion of ammonia and sodium sulphite as in Example 2. The crystals can be filtered, washed with water, and dried in an air exhausted space or in an inert gas to avoid oxidation. The dried product, cuprous nicotinammino bromide, should be preserved in a hermetically sealed container to avoid oxidation.

Example 4

Cuprous nicotinammino iodide is prepared in the same manner as the bromide of Example 3. This compound is, however, stable in air and can be kept indefinitely.

Example 5

Two moles of cuprous cyanide (CuCN) in aqueous suspension is treated with one mole of a soluble nicotine salt and then one mole of a soluble cyanide, such as sodium or potassium cyanide dissolved in water, is added slowly to the mixture which is kept stirred by a mechanical stirrer in order to avoid the formation of gummy material. The crystals increase in nicotine cyanide content until the composition agrees closely with the formula $(CuCN)_2.C_{10}H_{14}N_2HCN$. The crystals are readily filtered and washed, and become dry after a short exposure to air.

In fluorescent properties, the most brilliant are the double thiocyanate with a greenish yellow fluorescence, the nicotinammino bromide and iodide with orange and yellow fluorescence, respectively, and the crystalline cuprous nicotine cyanide with yellowish green fluorescence.

Having thus described my invention, I claim:

1. A fluorescent, crystalline compound selected from the group consisting of cuprous nicotine thiocyanate of the formula $$Cu(CNS).C_{10}H_{14}N_2.HCNS$$

cuprous nicotine cyanide of the formula $$(CuCN)_2.C_{10}H_{14}N_2.HCN$$

and cuprous nicotinammino thiocyanate of the formula $(CuCNS).C_{10}H_{14}N_2$.

2. The fluorescent, crystalline cuprous nicotine thiocyanate of the formula $$Cu(CNS).C_{10}H_{14}N_2.HCNS$$

3. The fluorescent, crystalline cuprous nicotine cyanide of the formula $$(CuCN)_2.C_{10}H_{14}N_2.HCN$$

4. The fluorescent, crystalline cuprous nicotinammino thiocyanate of the formula $$Cu(CNS).C_{10}H_{14}N_2.$$

CLAUDE R. SMITH.

REFERENCES CITED

The following references are of record in the file of this patent:

UNITED STATES PATENTS

| Number | Name | Date |
|---|---|---|
| 2,356,185 | Smith | Aug. 22, 1944 |

FOREIGN PATENTS

| Number | Country | Date |
|---|---|---|
| 492,660 | Great Britain | Sept. 20, 1938 |

OTHER REFERENCES

Hansberry: J. Econ. Entom., vol. 34, pp. 80–83 (1941).

Hansberry: J. Econ. Entom., vol. 35, pp. 915–918 (1942).

Hackh: "Chemical Dictionary" (The Blakeston Co., Philadelphia, 1944); pp. 242–243.